United States Patent Office 2,935,471
Patented May 3, 1960

2,935,471

FLAME RETARDANT COMPOSITION

Ralph Aarons, Wilmington, Del., William H. Baumgartner, Chadds Ford, Pa., and Daniel R. English, Middletown, N.J., assignors to E. I. du Pont de Nemours and Company, Wilmington, Del., a corporation of Delaware No Drawing. Application September 10, 1958
Serial No. 760,060

10 Claims. (Cl. 252—8.1)

This invention relates to compositions useful as flame retardants and to flammable, non-volatile, polymeric organic compounds treated therewith.

More particularly, the present invention is directed to compositions consisting essentially of 60 to 90% by weight of at least one compound selected from the group consisting of ammonium sulfamate, ammonium sulfate, diammonium hydrogen phosphate and monoammonium dihydrogen phosphate, 5 to 20% by weight of a weakly basic, water-soluble nitrogenous substance, and 5 to 20% by weight of a water-soluble boron compound such as boric acid or an alkali metal borate having an alkali metal to boron atomic ratio of from about ⅓ to ½. Combinations of alkali metal borates and boric acid are also suitable for use in the present invention.

This application is a continuation-in-part of our copending application Serial No. 626,604, filed December 6, 1956, now abandoned, which is a continuation-in-part of Serial No. 345,712, filed March 30, 1953, now abandoned, which in turn is a continuation-in-part of our parent application Serial No. 333,332, filed January 26, 1953, now abandoned.

Heretofore, flame retardant compositions containing ammonium sulfamate, ammonium sulfate, monoammonium hydrogen phosphate, or diammonium hydrogen phosphate, in all or in part, have not proved to be entirely satisfactory for the treatment of paper and textiles. The treated material tends to become discolored and weakened after exposure to high temperatures or upon prolonged aging at mildly elevated temperatures.

We have found that when compositions consisting of (1) a water-soluble alkali metal borate or boric acid, (2) a weakly basic, water-soluble nitrogenous compound, and (3) at least one ammonium salt of the group consisting of ammonium sulfamate, ammonium sulfate, diammonium hydrogen phosphate and monoammonium dihydrogen phosphate, in critical amounts, are applied to non-volatile, flammable, polymeric organic materials, which are very rapidly charred by mineral acids at temperatures substantially below the combustion temperature of the organic material, in quantities sufficient to render the materials flame-retardant, these materials resist discoloration and weakening caused by exposure to heat.

The most desirable and useful flame-retardant compositions render the treated material free from afterglow. Materials treated with flame-retardant compositions of this invention containing at least 10% by weight of an ammonium salt of phosphoric acid will possess satisfactory freedom from afterglow.

Illustrative of the weakly basic, nitrogenous water-soluble substances employed in the compositions of our invention are dicyandiamide, urea, hexamethylenetetramine and semicarbazide. Of these, dicyandiamide is preferred.

The amounts of the weakly basic, nitrogenous, water-soluble compound and the boron compound present in the compositions of the invention are critical.

At least five parts by weight of the nitrogenous compound and five parts by weight of the boron compound in the compositions of the present invention will confer upon materials treated with such compositions substantial protection from discoloration and tenderization upon exposure to heat.

When monoammonium dihydrogen phosphate is used as the primary flame-retardant component of the composition, it is preferred to increase the amount of the nitrogenous compound and to use the alkali metal borate in amounts greater than 5% by weight so as to impart to the treated material satisfactory freedom from discoloration and to minimize tenderization upon exposure to heat.

It will be understood that when ammonium sulfamate is present in the compositions of our invention, a portion of it may be replaced by sulfamic acid. In such instances, it is preferred practice to increase the amount of the nitrogenous compound and to employ the alkali metal borate in the composition also in an amount greater than 5% by weight. By so increasing the amounts of nitrogenous substance and alkali metal borate, materials treated with the compositions are substantially free from discoloration and tenderization upon exposure to elevated temperature with relatively little loss in material strength since the alkali metal borate serves to mitigate the relatively higher acidity of solutions containing sulfamic acid.

It should be further understood that the amount of the ammonium salt present in the compositions of the present invention is critical. Compositions containing less than 60% by weight total of ammonium sulfamate, ammonium sulfate, diammonium hydrogen phosphate, and monoammonium dihydrogen phosphate, either singly or in combination, show a rapid loss in efficiency. Additionally, an extensive amount of such a composition is required to render treated materials flame retardant.

In order to impart heat stability to materials treated with compositions of the invention containing semicarbazide or urea (neither of which are equal in acid acceptance to dicyandiamide) as the nitrogenous compound, the compositions should preferably contain at least 15% by weight of urea or semicarbazide and at least 15% by weight of an alkali metal borate.

When freedom from afterglow is required and desirable, compositions of our invention should contain an ammonium salt of orthophosphoric acid in an amount of at least 10% by weight of the composition. It is preferred to add at least 1 part of an ammonium salt of orthophosphoric acid for every 3 parts of ammonium sulfamate or ammonium sulfate, or combination thereof, used in the composition in order to develop optimum afterglow prevention.

As has already been observed, an essential component of the compositions of the present invention is a water-soluble boron compound, either boric acid or an alkali metal borate having an atomic ratio of alkali metal to boron of from ⅓ to ½. There may be used, for instance, potassium or lithium tetraborate. It is preferred to use anhydrous sodium tetraborate. Borax and other hydrated borates may be used but they may lose their water of crystallization to the ammonium sulfamate. This may cause a dry composition to agglomerate.

Total substitution of the alkali metal borate by boric acid in the same percentages, 5–20%, by weight of the composition has the advantage of enhancing the physical properties of the flame-retardant compositions. Such compositions tend to be less hygroscopic upon standing having little tendency to cake and are preferred when the compositions are to be stored for more than 2–3 weeks before being used. Alkali metal borates, on the other hand, have the advantage of mitigating the acidic properties of solutions when sulfamic acid-ammonium sulfamate mixtures are used as the principal flame retardant on cotton textiles. A solution which has a pH closely approaching a value of 7, or neutral, has little effect on the strength of such textiles upon aging.

Boric acid is preferred for use in the flame-retardant mixtures disclosed herein when ammonium sulfate or ammonium sulfate-ammonium sulfamate mixtures are used as the principal flame-retardant components and particularly when the compositions are stored under relatively high humidity conditions. In all respects other than noted above, however, boric acid and alkali metal borates are substantially equal for the purposes of the present invention.

Mixtures of boric acid with an alkali metal borate may be used in the compositions of the invention as a substitute for the alkali metal borate with the same advantages conferred by the latter-named compound when used alone.

It may be desirable to add a wetting agent or surfactant to the fire retardant compositions of our invention in order to promote the desired degree of wettability, it being understood that the wetting agent serves only in its conventional manner and is in no way synergistic with the other components of our fire retardant compositions. If there is no wetting problem with the surface being treated, no wetting agent is necessary. Any powder or liquid surfactant which is compatible with the ingredients of the fire retardant compositions of the invention can be used. For compositions packaged and sold in the dry state powdery anionic surfactants are preferred. Nonionic and cationic surfactants are also suitable for use with the flame retardant compositions.

It will be understood that suitability is dependent upon the compatibility of the surfactant with the flame retardant composition and upon the ability of the surfactant to cause the flame retardant solution to properly wet the substrate being treated. As already indicated, the surfactant is not an essential component of the flame retardant composition and needs only to be used where necessary to increase the speed of penetration or wetting action of the treating solution.

When a surfactant is present in the fire retardant compositions, it is normally present in very small amounts (less than 1% on solids basis). It is generally preferred to use about 0.5 part of surfactant per 99.5 parts of total dry flame retardant. However, more or less surfactant may be employed depending upon the efficiency of the surfactant as a wetting agent and the degree of wetting required. In the amounts present in the compositions of the invention, the wetting agent (surfactant) cannot and does not affect the flammability, discoloration tendencies or the tenderization (tensile) of the treatment on the substrate.

Typical of the wetting agents which can be employed are the sodium salt of an alkyl aryl sulfonate in which the alkyl group is derived from kerosene (a hydrocarbon mixture boiling 150°–250° C.) and the aryl group is phenyl, and the sodium salt of saturated hydrocarbon sulfonates. Among the many other wetting agents compatible with the compositions of the invention which can be used, there can be named as illustrative the following:

Anionic type:
    Du Pont's "Alkanol" B, sodium alkyl naphthylene sulfonate
    Du Pont's "Alkanol" DW, alkyl-aryl sodium sulfonate
    Antara's "Igepon" TE-42, sodium N-methyl-N-"tallow acid" taurate
    Monsanto's "Santomerse" 1, alkyl aryl sodium sulfonate
    Atlantic's "Ultra-Wet" K, alkyl benzene sodium sulfonate
    Wyandotte's "Kreelon" 4G, alkyl-aryl sodium sulfonate Non-ionic type:
    Atlas' "Brij" 35, polyoxyethylene lauryl ester
    Antara's "Emulphor" ON, polyoxyethylated fatty alcohol
    Armour's "Ethofat" C/60, polyoxyethylene-glycol ester of coconut fatty acid; 50 mols ethylene oxide added to 1 mol of acid
    Antara's "Igepal" CA-630, nonyl phenoxy polyoxyethylene ethanol
    Wyandotte's "Pluronic" F-68, a condensate of ethylene oxide with a hydrophobic base formed by condensing propylene oxide with propylene glycol
    Atlas' "Renex" 20, polyoxyethylene ester of mixed fatty and rosin acids
    Rohm and Haas' "Triton" X-100, alkyl-aryl polyether alcohol Cationic type:
    Armour's "Arquad" S, N-alkyl trimethyl ammonium chloride
    Fairfield Laboratories' "Cetab," cetyl trimethyl ammonium bromide
    Armour's "Ethomeen" C/20, tertiary amines; ethylene oxide condensation products of primary fatty amines The ammonium salts, that is, the flame-retardant components of the compositions of the present invention may be used singly or in combination. The individual flame-retardant components each have special advantages. For example, ammonium sulfamate flame-retardant compositions are especially desirable because of their excellent hand. Another advantage of our flame-retardant compositions containing ammonium sulfamate is that they do not cause efflorescence in the treated fabric or paper. Compositions containing an ammonium phosphate confer on the treated materials freedom from afterglow. Ammonium sulfate compositions are especially advantageous because of their low cost.

By combining selected flame-retardant components in certain ratios in the flame-retardant compositions, an optimum balance of the desired properties will be conferred upon the treated material. For instance, it is preferred to use combinations of ammonium sulfamate and monoammonium dihydrogen phosphate, with the ammonium sulfamate being present in major amounts when excellent hand is desired. Combinations of ammonium sulfate and diammonium hydrogen phosphate are particularly useful when preparing less expensive mixtures which have little tendency to pick up moisture during storage before use.

The exact flame-retardant composition to be used on a particular fabric is a matter of choice for one skilled in the art and the disclosure herein together with the examples will enable one skilled in the art to readily make a suitable selection.

Textiles or paper treated with compositions of the invention containing ammonium sulfamate as the principal flame-retardant component and at least 10% by weight of monoammonium dihydrogen phosphate, possess high flame-retardance, satisfactory freedom from afterglow, good hand, freedom from efflorescence, and protection from discoloration and tenderization upon exposure to elevated temperatures. Substitution of ammonium sulfate for ammonium sulfamate causes little loss in hand and the sulfate compound substantially equals ammonium sulfamate in the other desirable qualities noted above.

Compositions containing 40–70% by weight of ammonium sulfamate, 10–30% by weight of monoammonium dihydrogen phosphate, 5–20% by weight of a weakly basic, nitrogenous water-soluble substance, and 5–20% of an alkali metal borate are particularly preferred when the compositions are applied to fabrics shortly after mixing. In place of the monoammonium dihydrogen phosphate there may be used diammonium hydrogen phosphate. However, the monoammonium salt is preferred for ammonium sulfamate compositions. As the weakly basic, water-soluble nitrogenous compound it is especially preferred to use dicyandiamide.

The concentration of impregnated fire-retardant which is necessary will vary with the effectiveness of the retardant, the degree of fire-retardance desired, and the relative combustibility of the material to which applied. In general, cellulosic materials such as regenerated cellulose, cotton fabrics, paper, etc., require from 4 to 10% of their weight of ammonium sulfamate, ammonium sulfate, monoammonium dihydrogen phosphate, diammonium hydrogen phosphate, either singly or in combination, to give products which will not propagate a flame and which ignite with difficulty at the point of contact with the igniting flame.

In the examples, the compositions of the invention are applied from aqueous solution. Fire-retarding effects may also be obtained when the composition is applied by any method. For example, powdered crystals may be dusted upon a damp surface or surface treated with adhesive; the composition may be applied from solution or suspension in an organic liquid; or in the case of a liquid solution or dispersion of a film forming substance which is intended to be cast into films or fibers, the composition may be incorporated by dissolving or otherwise mixing directly into the liquid.

An outstanding advantage of the compositions of our invention over the prior art flame retardants is the fact that materials treated with our compositions possess high resistance to discoloration or weakening after exposure to high temperature. At the same time the treated materials retain good hand. An outstanding advantage conferred upon materials treated with compositions containing ammonium sulfamate or ammonium sulfate as the principal flame retardant component is their lack of efflorescence at low relative humidities.

In treating materials with the compositions of this invention, no special techniques are required. For example, when treating fabrics or paper by impregnation with an aqueous solution of the composition of this invention, drying of the treated fabrics may be accomplished at room temperature conditions. The treated materials can be dried more rapidly by heating at approximately 100° C. in any of the conventional types of drying equipment. A beneficial advantage of the compositions of our invention is that treated materials dried at about 100° C. do not suffer discoloration or tenderization if inadvertently overheated because of excessive drying time.

The compositions of the present invention confer upon non-volatile, flammable, polymeric organic materials such desirable properties as (1) flame retardance, (2) freedom from stiffness or boardiness, and (3) very high resistance to discoloration or tenderization during drying of the solutions of the flame retardant on the material or during use of the material.

The invention may be used to advantage with any non-volatile, flammable, polymeric organic material which is very rapidly charred by mineral acids at temperatures substantially below the combustion temperature of the organic material.

Typical of the flammable materials which can be rendered flame-retardant by treatment with compositions of the invention are cellulosic materials, such as for instance, wood, wood fiber, straw, sawdust, wood flour, paper, viscose rayon, cotton fibers, cotton textiles and cellophane. Other materials which can be rendered flame-retardant by the practice of our invention include naturally occurring fibrous materials, for example, wool and silk and such synthetic polymeric compounds as for instance polyvinyl acetate and polyvinyl alcohol cast from latices or solutions in the form of films or fibers.

Some of the compositions of our inventions, particularly those containing ammonium sulfamate, an ammonium phosphate, borax and dicyanodiamide, have found special utility in improving the light fastness of dyed fabrics. This is in addition to rendering the dyed fabrics flame-retardant.

In order to better understand the invention, reference should be had to the following illustrative examples:

*Example 1*

A piece of cotton textile material of plain weave, weighing about 6.5 ounces per square yard, was immersed in the following solution:

49 parts of ammonium sulfamate
21 parts of diammonium hydrogen phosphate
15 parts of anhydrous borax
15 parts of dicyandiamide
0.7 part of "Kreelon" 4G, an alkarylsulfonate type of wetting agent
900 parts of water The textile material was then squeezed between tightly fitted rubber rolls under such pressure as to leave a weight of solution in the fabric approximately equal to the weight of the dry fabric.

The cloth was drum dried at a temperature of 100° C. A sample of the cloth was then placed in an oven at a temperature of 135° C. After the cloth was exposed to this temperature for a period of 60 minutes, it had not significantly discolored. This result was in direct contrast to the discoloration observed when a similar piece of cloth was treated with an aqueous solution of a composition consisting of ammonium sulfamate, diammonium hydrogen phosphate and an alkarylsulfonate type wetting agent and then exposed to the identical drum drying conditions followed by oven drying at a temperature of 135° C. for a period of 10 minutes.

A distilled water extract of the heat-treated sample of textile treated with the composition of our invention as set forth above had a pH of 4.8. An aqueous extract of the oven-heated textile sample treated with a mixture of ammonium sulfamate, diammonium hydrogen phosphate, and a wetting agent had a pH of 3.1.

The tensile strength of the treated textile of this example declined negligibly during the heat exposure, that is, from 48.8 to 47.8 pounds per inch width. A similar piece of textile treated with an aqueous solution consisting of 63 parts ammonium sulfamate, 27 parts of diammonium phosphate, 10 parts of urea, 0.6 part of an alkarylsulfonate type wetting agent, and about 400 parts of water, dried, and exposed to heat in the manner already described, showed a decline in tensile strength from 56.4 to 28.0 pounds per inch width.

A piece of the original, untreated, textile material when exposed to oven heat at a temperature of 135° C. for a period of 60 minutes suffered a decline in tensile strength from 47.2 to 46.2 pounds per inch width.

*Example 2*

A piece of the cotton textile material described in Example 1 was treated in accordance with the conditions set forth in Example 1 using the following solution:

63 parts of ammonium sulfamate
27 parts of diammonium hydrogen phosphate
5 parts of anhydrous borax
5 parts of dicyandiamide
0.7 part of "Kreelon" 4G, an alkarylsulfonate type of wetting agent
900 parts of water The cloth was dried as in Example 1 and then exposed to oven heat at a temperature of 135° C. for a period of one hour. The fabric was negligibly discolored and the textile surface had a pH (distilled water extract) of 4.0 after this exposure.

*Example 3*

The composition used as a flame retardant in Example 1 was also applied by the procedure of Example 1 to an unbleached wrapping kraft paper weighting 16 lbs. per 1000 sq. feet and having a tensile strength of 29.7 pounds per inch width.

The treated paper, after having been drum dried at a temperature of 100° C., had a tensile strength of 30.9 lbs. per inch width. The treated paper was then heated in an oven at a temperature of 135° C. for a period of 60 minutes. After this exposure the paper had a tensile strength of 32.4 lbs. per inch width. The distilled water extract had a pH of 4.3. The treated paper was negligibly discolored.

A similar piece of paper treated with an aqueous solution of a prior art ammonium sulfamate composition and drum dried at a temperature of 100° C. had a tensile strength of 24.5 lbs. per inch width. The paper was oven-dried at a temperature of 135° C. for a period of 60 minutes. After this exposure the paper became very much browner in color. Its tensile strength was 24.4 lbs. per inch width and the pH of a distilled water extract of the exposed paper was 3.5.

*Example 4*

A piece of cotton textile material similar to that used in Example 1 was treated by the procedure of Example 1 using the following compositions:

49 parts of ammonium sulfamate
21 parts of ammonium dihydrogen phosphate
15 parts of anhydrous borax
15 parts of dicyandiamide
0.6 part of "Kreelon" 4G, an alkarylsulfonate type of wetting agent
400 parts of water The textile dried according to the procedure of Example 1 was then placed in an oven at a temperature of 135° C. for a period of 1 hour. The heated textile was negligibly discolored and its distilled water extract had a pH of 5.2.

*Example 5*

A piece of cotton fabric was treated in accordance with Example 1 using the following solution:

24 parts of ammonium sulfamate
12 parts of diammonium hydrogen phosphate
12 parts of anhydrous borax
12 parts of dicyandiamide
0.36 part of "Kreelon" 4G, an alkarylsulfonate type of wetting agent
440 parts of water The treated fabric was dried according to the procedure as set forth in Example 1. The fabric was then placed in an oven at a temperature of 135° C. for a period of 60 minutes. It was negligibly discolored. A distilled water extract of the dried treated fabric had a pH of 5.5.

*Example 6*

The following flame retardant composition was used to treat a piece of cotton fabric in the manner described in Example 1:

25 parts of ammonium sulfamate
5 parts of diammonium hydrogen phosphate
10 parts of anhydrous borax
10 parts of dicyandiamide
0.3 part of "Kreelon" 4G, an alkarylsulfonate type of wetting agent
450 parts of water The treated fabric was dried according to the procedure of Example 1. It was then placed in an oven at a temperature of 135° C. for a period of 60 minutes. After this exposure the fabric was negligibly discolored and had a pH (distilled water extract) of 6.4.

*Example 7*

A piece of cotton fabric as used in Example 1 was treated in the manner described in Example 1 using the following flame retardant solution:

25 parts of ammonium sulfamate
15 parts of diammonium hydrogen phosphate
5 parts of anhydrous borax
5 parts of dicyandiamide
0.3 part of "Kreelon" 4G, an alkarylsulfonate type of wetting agent
450 parts of water The treated fabric was dried according to the procedure of Example 1. It was then placed in an oven at a temperature of 135° C. for a period of 60 minutes. The fabric was not substantially discolored by this exposure. A distilled water extract of the fabric had a pH of 5.0.

*Example 8*

A piece of the cotton fabric similar to that used in Example 1 was treated in accordance with the procedure of Example 1 with the following solution:

35 parts of ammonium sulfamate
10 parts of diammonium hydrogen phosphate
2.5 parts of anhydrous borax
2.5 parts of dicyandiamide
0.3 part of "Kreelon" 4G, an alkarylsulfonate type of wetting agent
450 parts of water The treated fabric was dried according to the procedure of Example 1. It was then placed in an oven at a temperature of 135° C. for a period of 1 hour. The fabric was not noticeably discolored and its distilled water extract had a pH of 4.0.

*Example 9*

A piece of cotton fabric similar to that used in Example 1 was treated according to the procedure set forth in Example 1 with the following flame retardant composition:

24.5 parts of ammonium sulfamate
10.5 parts of diammonium hydrogen phosphate
7.5 parts of dicyandiamide
5.25 parts of anhydrous borax
2.25 parts of boric acid
0.3 part of "Kreelon" 4G, an alkarylsulfonate type of wetting agent
450 parts of water Drying the treated fabric was carried out in accordance with the procedure set forth in Example 1. The fabric was then placed in an oven at a temperature of 135° C. for a period of 60 minutes. The fabric was negligibly discolored. A distilled water extract of the heat exposed, treated fabric had a pH of 4.7.

*Example 10*

A piece of cotton textile material of plain weave, weighing about 8 oz. per sq. yd., was immersed in the following solution:

89.5 diammonium hydrogen phosphate
5 parts of dicyandiamide
5 parts of anhydrous borax
0.5 part of "Kreelon" 4G, an alkarylsulfonate type of wetting agent
900 parts of water The textile material was then squeezed between tightly fitted rubber rolls under such pressure as to leave a weight of solution in the fabric approximately equal to the weight of the dry fabric. The cloth was then drum dried at a temperature of 100° C. The dried cloth was exposed to oven heat at a temperature of 135° C. for a period of 10 minutes. The fabric was negligibly disclosed and the textile surface had a pH (distilled water extract) of 4 after this exposure.

By contrast, a similar piece of cloth treated with an aqueous solution consisting of only diammonium hydrogen phosphate, such that the treated fabric contained 10% of its weight of the ammonium phosphate salt, and then exposed to the identical drum drying condition followed by oven drying at a temperature of 135° C. for a period of 10 minutes, was significantly discolored and had a pH of 4.

*Example 11*

A piece of the cotton textile material described in Example 10 was treated in accordance with the conditions set forth in Example 10 using the following solution:

69.5 parts of ammonium sulfate
15 parts of dicyandiamide
15 parts of anhydrous borax
0.5 part of "Kreelon" 4G, an alkarylsulfonate type of wetting agent
900 parts of water The cloth was dried as in Example 10 and then exposed to oven heat at a temperature of 135° C. for a period of one hour. The fabric was negligibly discolored and the textile surface had a pH (distilled water extract) of 4.5 after this exposure.

By contrast, a piece of the same cotton textile material treated with a 10% solution of ammonium sulfate in accordance with the method described in Example 10 and dried as shown in Example 10, after one hour heating at 135° C. in an oven had a textile surface pH (distilled water extract) of less than 1.5 and was severely discolored.

*Example 12*

A piece of the cotton textile material described in Example 10 was treated in accordance with the conditions set forth in Example 10 using the following solution:

69.5 parts of diammonium hydrogen phosphate
15 parts of dicyandiamide
15 parts of anhydrous borax
0.5 part of "Kreelon" 4G, an alkarylsulfonate type of wetting agent
900 parts of water The cloth was dried as in Example 1 and then exposed to oven heat at a temperature of 135° C. for a period of one hour. The fabric was negligibly discolored and the textile surface had a pH (distilled water extract) of 5 after this exposure.

*Example 13*

A piece of the cotton textile material described in Example 10 was treated in accordance with the conditions set forth in Example 10 using the following solution:

89.5 parts of ammonium sulfate
5 parts of dicyandiamide
5 parts of anhydrous borax
0.5 part of "Kreelon" 4G, an alkarylsulfonate type of wetting agent
900 parts of water The cloth was dried as in Example 1 and then exposed to oven heat at a temperature of 135° C. for a period of 30 minutes. At the end of this time the fabric was only negligibly discolored.

The treated fabric and paper of the above examples when subjected for a period of 12 seconds to a luminous flame from a Bunsen burner showed charring in the vicinity of the area of contact with the flame but they did not continue to burn after the removal of the flame. Samples of untreated fabric and paper were completely consumed when subjected to a luminous Bunsen flame.

This "flame" test was carried out by clamping a sample of the treated material approximately 2½ inches in width by 8 inches in length in a frame in such a manner that about a 2 inch width and an entire 8 inch length were exposed. The sample was mounted in a vertical plane with the long dimension in a vertical position. The clamping frame was adjusted so that the center of the 2 inch width of the material to be treated was ¾ of an inch above the top of a ⅜ inch (inside diameter) Bunsen burner. The Bunsen burner was removed and a flame ignited and adjusted to a height of 1.5 inches with the air supply completely shut off. The burner was placed beneath the clamped sample of cellulosic material for a period of 12 seconds.

*Example 14*

A section of a cotton loop rug was immersed in the following solution:

79.5 parts of ammonium sulfamate
10.0 parts of dicyandiamide
10.0 parts of anhydrous borax
0.5 part of "Kreelon" 4G, an alkarylsulfonate type of wetting agent
900 parts of water The section of cotton loop rug was then squeezed between tightly fitted rubber rolls under such pressure as to leave a weight of solution in the loop rug approximately equal to the weight of the dry loop rug section.

The treated section of cotton loop rug was then dried at a temperature of 100° C. The treated loop rug section was then placed in an oven at a temperature of 135° C. for a period of one hour. The cotton loop rug was not noticeably discolored upon exposure to this condition. The treated rug was found to possess satisfactory flame retardance.

*Example 15*

A piece of cotton textile material of plain weave, weighing about 6.5 ounces per square yard, was immersed in the following solution:

49 parts of ammonium sulfamate
21 parts of diammonium hydrogen phosphate
15 parts of anhydrous borax
15 parts of dicyandiamide
900 parts of water The textile material was removed from the 10% treating solution and squeezed between tightly fitted rolls under such pressure as to leave a weight of solution in the fabric approximately equal to the weight of the dry fabric.

The cloth was drum dried at a temperature of 100° C. A sample of the cloth was then placed in an oven at a temperature of 135° C. After the cloth was exposed to this temperature for a period of 60 minutes it was not significantly discolored. The tensile strength of the treated textile of this example declined negligibly during the heat exposure; that is, from 48.8 to 47.8 pounds per inch width.

A piece of the original untreated textile material which was exposed to oven heat at a temperature of 135° C. for a period of 60 minutes suffered a decline in tensile strength from 47.2 to 46.2 pounds per inch width.

*Example 16*

A piece of the cotton textile material described in Example 15 was treated in accordance with the conditions set forth in Example 15 using the following solution:

49 parts of ammonium sulfamate
21 parts of diammonium hydrogen phosphate
15 parts of anhydrous borax
15 parts of dicyandiamide
0.7 part of "Kreelon" 4G, an alkyl aryl sodium sulfonate type of anionic surface active agent made by the Wyandotte Chemicals Corporation
900 parts of water The cloth was treated and dried as in Example 15 and was then exposed to oven heat at a temperature of 135° C. for a period of one hour. As in Example 15, where no surfactant is employed, the fabric was negligibly discolored and the tensile strength of the textile was not significantly different than that of Example 15.

*Example 17*

The test conditions of Example 16 were repeated except that a non-ionic surface active agent known as "Ethofat" C/60, a polyoxyethylene glycol ester of coconut fatty acid made by Armour and Company, is employed in place of the previously used "Kreelon" 4G.

The cloth was dried as in Example 16 and was then exposed to oven heat at a temperature of 135° C. for a period of one hour. As in Example 16, the fabric was observed to be negligibly discolored and to have a tensile strength essentially the same as the textile of Example 15.

*Example 18*

Example 16 was again repeated except that in this case the surface active agent is "Cetab," cetyl trimethylammonium bromide, a cationic wetting agent made by the Fairfield Laboratories.

The cloth was dried as in Example 15 and then was exposed to oven heat at a temperature of 135° C. for a period of one hour. The fabric was negligibly discolored by this heat treatment and the tensile strength was not significantly different from the fabric treated in Example 15.

*Example 19*

A piece of the cotton textile material described in Example 15 was treated in accordance with the conditions set forth in Example 15, but using the following 10% solids treating solution:

69.5 parts of diammonium hydrogen phosphate
15 parts dicyandiamide
15 parts of anhydrous borax
900 parts of water The cloth was treated and dried as in Example 15 and was then exposed to oven heat at a temperature of 135° C. for a period of one hour. After heat treatment the fabric was observed to be negligibly discolored and to have substantially the same tensile strength as before heat treatment. Flame retardancy was excellent.

*Example 20*

A piece of the cotton textile material described in Example 15 was treated in accordance with the conditions set forth in Example 15 using the following solution:

69.5 parts of diammonium hydrogen phosphate
15 parts of dicyandiamide
15 parts of anhydrous borax
0.5 part of "Alkanol" B, sodium alkyl methylene sulfonate, an anionic type surfactant manufactured by E. I. du Pont de Nemours & Co.
900 parts of water The cloth was dried as in Example 15 and was then exposed to oven heat at a temperature of 135° C. for a period of 1 hour. The effect of the addition of 0.5 part of "Alkanol" B to the flame-retardant composition of Example 19 was insignificant insofar as fabric discoloration, tensile strength and flammability are concerned. The fabric of this example was negligibly discolored and was not significantly different in tensile strength or flammability than the fabric treated by the procedure of Example 19.

*Example 21*

A piece of the cotton textile material described in Example 15 was treated in accordance with the conditions set forth in Example 15, but the treating solution of Example 20 was employed with the exception that 0.5 part of "Pluronic" F-68, a condensate of ethylene oxide with a hydrophobic base formed by condensing propylene oxide with propylene glycol, a non-ionic surfactant manufactured by the Wyandotte Chemicals Corporation, was substituted as the wetting agent. After treating and drying the cloth as in Example 15 it was exposed to oven heat at a temperature of 135° C. for a period of one hour. After heat treatment the fabric was observed to be negligibly discolored and to exhibit essentially the same tensile properties as the fabric of Example 19. Flammability characteristics were also the same as in Example 19.

*Example 22*

A piece of the cotton textile material described in Example 15 was treated in accordance with the conditions set forth in Example 15, but using the treating solution of Example 19 with the exception that 0.5 part of "Arquad" S, a cationic surfactant composed of alkyl trimethylammonium chlorides made by Fairfield Laboratories, was substituted for the wetting agent. The cloth was treated and dried as in Example 15 and was then exposed to oven heat at a temperature of 135° C. for a period of one hour. The fabric was negligibly discolored and its tensile characteristics were not significantly different from those of the fabric of Example 19.

*Example 23*

A piece of cotton textile material of plain weave, weighing about 7.8 ounces per square yard, was immersed in an aqueous solution composed of:

46.0 parts by wt. ammonium sulfate
19.6 parts by wt. diammonium phosphate
13.7 parts by wt. dicyandiamide
20.1 parts by wt. boric acid
0.6 part by wt. "Kreelon" 4G, an alkarylsulfonate type of wetting agent
735 parts by wt. of water The textile material was then squeezed between tightly fitted rubber rolls under such pressure as to leave an amount of solution in the fabric approximately equal to the weight of the dry fabric.

The cloth was dried at a temperature ca. 100° C. A sample of the cloth was then placed in an oven at a temperature of 135° C. After the cloth was exposed to this temperature for one hour it had not significantly discolored.

A distilled water extract of a heat treated cloth sample treated as described above had a pH of 5.5. This pH was unchanged from that observed for an extract of unheated cloth treated with the composition of our invention as set forth above.

The tensile strength of the treated textile of this example declined only slightly during the heat exposure, that is, from 103 to 92 pounds per inch width. A similar piece of textile treated with an aqueous solution of 63 parts ammonium sulfamate, 27 parts of diammonium phosphate, 10 parts of urea, 0.6 part of an alkarylsulfonate type wetting agent, and about 400 parts of water, dried and exposed to heat in the manner already described above, showed a decline in tensile strength from 112.8 to 56 pounds per inch width.

A piece of original untreated cloth showed a decline in tensile strength from 119.8 to 112.6 pounds per inch width when exposed to heat as above.

The cloth treated with the first mentioned composition of this example was found to have outstanding flame resistance. When subjected to a Bunsen burner flame in the manner described in Example 13, the sample refused to continue burning when the flame was removed, and had a significantly smaller charred area than any other treatment tested; i.e. a charred section averaging 1.55 inches in length as compared to 2.25 inches for the next best treatment.

Example 24

A piece of the cotton textile material described in Example 23 was treated in accordance with the conditions set forth in Example 23 adding the following composition in parts by weight:

25.0 parts of ammonium sulfamate
21.0 parts of ammonium sulfate
19.6 parts of diammonium phosphate
13.7 parts of dicyandiamide
20.1 parts of boric acid
0.6 part of "Kreelon" 4G, an alkarylsulfonate type of wetting agent.

The composition was dissolved in 735 parts by weight of water.

The cloth was dried and then exposed to a temperature of 135° C. for one hour as in Example 23. The fabric was negligibly discolored and had a pH (distilled water extract) of 5.5 after this exposure. This fabric shows excellent flame retardancy.

Example 25

A piece of the cotton textile material described in Example 23 was treated by the procedure of that example using the following solution in parts by weight:

46.0 parts of ammonium sulfate
19.6 parts of diammonium hydrogen phosphate
13.7 parts of dicyandiamide
7.0 parts of borax pentahydrate
13.1 parts of boric acid
0.6 part of "Kreelon" 4G, an alkarylsulfonate type of wetting agent
735 parts of water The cloth was dried and then exposed to a temperature of 135° C. for one hour as in Example 23. The fabric was negligibly discolored and had a pH of 5.5 (distilled water extract after this exposure).

The embodiments of the invention in which an exclusive property or privilege is claimed are defined as follows:

1. A composition useful as a flame retardant comprising 60 to 90% by weight of at least one compound selected from the group consisting of ammonium sulfamate, ammonium sulfate, diammonium monohydrogen phosphate and monoammonium dihydrogen phosphate, 5 to 20% by weight of a weakly basic, nitrogenous, water-soluble compound, and 5 to 20% by weight of a water-soluble boron compound selected from the group consisting of boric acid and an alkali metal borate, said alkali metal borate having an alkali metal to boron atomic ratio of from about ⅓ to ½.

2. A composition useful as a flame retardant consisting of from 60 to 90% by weight of at least one compound selected from the group consisting of ammonium sulfamate, ammonium sulfate, diammonium monohydrogen phosphate and monoammonium dihydrogen phosphate, 5 to 20% by weight of a weakly basic, nitrogenous, water-soluble compound selected from the class consisting of dicyandiamide, urea, hexamethylenetetramine and semicarbazide, 5 to 20% by weight of a water-soluble boron compound selected from the group consisting of boric acid and an alkali metal borate, said alkali metal borate having an alkali metal to boron atomic ratio of from about ⅓ to ½, and less than 1% by weight of a wetting agent.

3. A composition useful as a flame retardant comprising from 60 to 90% by weight of ammonium sulfamate, 5 to 20% by weight of a weakly basic nitrogenous water-soluble compound selected from the class consisting of dicyandiamide, urea, hexamethylenetetramine, and semicarbazide, and 5 to 20% by weight of a water-soluble boron compound selected from the group consisting of boric acid and an alkali metal borate having an alkali metal/boron atomic ratio of from about ⅓ to ½.

4. A composition useful as a flame retardant comprising 60 to 90% by weight of ammonium sulfate, 5 to 20% by weight of a weakly basic nitrogenous water-soluble compound selected from the class consisting of dicyandiamide, urea, hexamethylenetetramine, and semicarbazide, and 5 to 20% by weight of a water-soluble boron compound selected from the group consisting of boric acid and an alkali metal borate having an alkali metal/boron atomic ratio of from about ⅓ to ½.

5. A composition useful as a flame retardant consisting of 46 parts of ammonium sulfate, 19.6 parts of diammonium phosphate, 13.7 parts of dicyandiamide, 20.1 parts of boric acid and 0.6 part of an alkyl-aryl sulfonate, said parts being by weight.

6. A composition useful as a flame retardant consisting of 25 parts of ammonium sulfamate, 21 parts of ammonium sulfate, 19.6 parts of diammonium phosphate, 13.7 parts of dicyandiamide, 20.1 parts of boric acid and 0.6 part of an alkyl-aryl sulfonate, said parts being by weight.

7. A product comprising a non-volatile, flammable, polymeric organic substance capable of being rapidly charred by mineral acids at temperatures substantially below its combustion temperature and, in sufficient amount to act as a flame retardant therefor, the composition of claim 1.

8. A product comprising a fibrous cellulosic material and, in sufficient amount to act as a flame retardant therefor, the composition of claim 1.

9. A product comprising paper and, in sufficient amounts to act as a flame retardant therefor, the composition of claim 1.

10. A product comprising a cotton textile and, in sufficient amount to act as a flame retardant therefor, the composition of claim 4.

References Cited in the file of this patent

UNITED STATES PATENTS

| | | |
|---|---|---|
| 2,452,054 | Jones et al. | Oct. 26, 1948 |
| 2,452,055 | Jones et al. | Oct. 26, 1948 |
| 2,771,379 | Dario | Nov. 20, 1956 |